United States Patent
Mottier

(10) Patent No.: US 7,424,009 B2
(45) Date of Patent: Sep. 9, 2008

(54) METHOD OF MAPPING CHIPS OF A SPREAD OUT SYMBOL TO SUB-CHANNELS OF A MULTI-CARRIER TRANSMISSION NETWORK

(75) Inventor: David Mottier, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/964,930

(22) Filed: Oct. 15, 2004

(65) Prior Publication Data

US 2006/0215536 A1   Sep. 28, 2006

(30) Foreign Application Priority Data

Oct. 16, 2003  (EP) .................................. 03292581

(51) Int. Cl.
   *H04B 7/216*   (2006.01)
(52) U.S. Cl. ..................... 370/355; 370/342; 375/141
(58) Field of Classification Search ............... 370/335, 370/342; 375/130, 141, 149, 150
   See application file for complete search history.

(56) References Cited

U.S. PATENT DOCUMENTS 6,999,467 B2 *  2/2006  Krauss et al. ............... 370/441
7,310,366 B2 * 12/2007  Nitsch ......................... 375/147

FOREIGN PATENT DOCUMENTS

| EP | 1 085 689 | 3/2001 |
|---|---|---|
| EP | 1 179 904 | 2/2002 |
| JP | 2000-332724 | 11/2000 |

OTHER PUBLICATIONS

Hiroyuki Atarashi, et al., "Broadband Packet Wireless Access Based on VSF-OFCDM and MC/DS-CDMA," IEEE International Symposium on Personal, Indoor and Mobile Radio Communications, vol. 3, Sep. 15, 2002, pp. 992-997.
Ramjee Prasad, et al., An Overview of Multi-Carrier CDMA, Spread Spectrum Techniques and Applications Proceedings, 1996, IEEE 4th International Symposium on Mainz, Germany, Sep. 22-25, 1996, pp. 107-114.
U.S. Appl. No. 10/924,982, filed Aug. 25, 2004, Mottier et al.
U.S. Appl. No. 10/922,939, filed Aug. 23, 2004, Mottier et al.
U.S. Appl. No. 10/964,930, filed Oct. 15, 2004, Mottier.

* cited by examiner

*Primary Examiner*—Ricky Ngo
*Assistant Examiner*—Chandrahas Patel
(74) *Attorney, Agent, or Firm*—Oblon, Spivak, McClelland, Maier & Neustadt, P.C.

(57) ABSTRACT

The present invention concerns a method of mapping chips of a spread out symbol to sub-channels of a group of sub-channels of a Multi-Carrier transmission channel of a Multi-Carrier transmission network, the spread out symbol being formed by multiplying a data item to be transmitted by elements of a spreading sequence, the mapped chips being further modulated using an orthogonal frequency division multiplexing modulation, each sub-channel of the Multi-Carrier transmission channel being defined by a carrier frequency of the Multi-Carrier transmission channel and a time slot wherein an orthogonal frequency division multiplexing symbol is transmitted, wherein the chips are ordered in a predetermined order.

17 Claims, 5 Drawing Sheets

| | F1 | F2 | F3 | F4 |
|---|---|---|---|---|
| T1 | $S_K(1)$ | $S_K(4)$ | $S_K(5)$ | $S_K(8)$ |
| T2 | $S_K(2)$ | $S_K(3)$ | $S_K(6)$ | $S_K(7)$ |

| | F1 | F2 | F3 | F4 |
|---|---|---|---|---|
| T1 | $S_K(1)$ | $S_K(2)$ | $S_K(3)$ | $S_K(4)$ |
| T2 | $S_K(8)$ | $S_K(7)$ | $S_K(6)$ | $S_K(5)$ |

| TiFj | User 1 | User 2 | User k |
|---|---|---|---|
| T1F1 | $S_1(1)$ data item 1 | $S_2(1)$ data item 1 | $S_k(1)$ data item 1 |
| T2F1 | $S_1(2)$ data item 1 | $S_2(2)$ data item 1 | $S_k(2)$ data item 1 |
| T2F2 | $S_1(3)$ data item 1 | $S_2(3)$ data item 1 | $S_k(3)$ data item 1 |
| T1F2 | $S_1(4)$ data item 1 | $S_2(4)$ data item 1 | $S_k(4)$ data item 1 |
| T1F3 | $S_1(5)$ data item 1 | $S_2(1)$ data item 2 | $S_k(5)$ data item 1 |
| T2F3 | $S_1(6)$ data item 1 | $S_2(2)$ data item 2 | $S_k(6)$ data item 1 |
| T2F4 | $S_1(7)$ data item 1 | $S_2(3)$ data item 2 | $S_k(7)$ data item 1 |
| T1F4 | $S_1(8)$ data item 1 | $S_2(4)$ data item 2 | $S_k(8)$ data item 1 |

Fig. 8

| TiFj | User 1 |
|---|---|
| T1F1 | $S_1(1)$ data item 1 |
| T2F1 | $S_1(2)$ data item 1 |
| T2F2 | $S_1(3)$ data item 1 |
| T1F2 | $S_1(4)$ data item 1 |
| T1F3 | $S_1(5)$ data item 1 |
| T2F3 | $S_1(6)$ data item 1 |
| T2F4 | $S_1(7)$ data item 1 |
| T1F4 | $S_1(8)$ data item 1 |

Fig. 9

METHOD OF MAPPING CHIPS OF A SPREAD OUT SYMBOL TO SUB-CHANNELS OF A MULTI-CARRIER TRANSMISSION NETWORK

BACKGROUND OF THE INVENTION

1. Field of the Invention

The present invention concerns a method of mapping chips of a spread out symbol to sub-channels of a group of sub-channels of a Multi-Carrier transmission network.

2. Discussion of the Background

In a Multi-Carrier transmission network using spreading sequences for multiplying data items to be transmitted, such as a Multi-Carrier Code Division Multiple Access transmission network, better known by the name MC-CDMA transmission network or an Orthogonal Frequency and Code Division Multiplexing network, better known by the name OFCDM transmission network, the L chips of each spread out symbol formed by multiplying a data item to be transmitted by L elements of the spreading sequence are mapped to L sub-channels of the Multi-carrier transmission network before an Orthogonal Frequency Division Multiplexing modulation and their transmission on the transmission network.

OFCDM and MC-CDMA transmission networks use orthogonal spreading sequences in order to selectively transmit and/or receive data to and/or from each of the users of the transmission network. OFCDM an MC-CDMA transmission networks suffer from multiple access interferences due to a loss of orthogonality among user's signals after their propagation through the multiple path channel. Since the channel is selective in frequency due to multi-paths and in time due to Doppler variations, the orthogonality among user's signals may be corrupted.

In order to reduce multiple access interferences, it has been proposed to optimise the selection of spreading sequences required to the different users.

The chip mapping also, aims at reducing the effect of the Multi-Carrier transmission channel selectivity by defining groups of sub-channels in the Multi-Carrier transmission channel that are correlated. The channel selectivity can be decomposed into two parts, the channel frequency selectivity and the channel time selectivity.

The channel frequency selectivity results from multi-path propagations. Obstructions generated by houses and other obstacles located between the transmitter and the receiver make that the transmitted signal is propagated on multiple paths, each path being delayed and attenuated differently. As a result, the signals from multiple paths arrive at the receiver at different times and these signals added constructively and destructively produce signal fading.

The channel time selectivity results from Doppler shifts due to the fact that the receiver or the transmitter or obstacles along the transmission path are moving. The channel can be then described as a time varying response channel.

In order to avoid problems generated by the channel frequency selectivity, it as been proposed to map the L chips of the spread out symbol on L several consecutive sub-carriers of the same time slot. Such technique is called a one dimensional frequency domain spreading.

In order to avoid problems generated by the channel time selectivity, it as been also proposed to map the L chips of the spread out symbol on L several consecutive time slots at the same frequency. Such technique is called a one dimensional time domain spreading.

It has been also proposed to combine both of these one dimensional spreading techniques and then to realize a two-dimensional in time and frequency domain spreading.

According to such technique, the L chips of the spread out symbol are mapped on L sub-channels involving consecutive sub-carriers and consecutive time slots. Thanks to that technique, it is then possible to limit problems generated either by the channel frequency selectivity and the channel time selectivity.

Such two-dimensional spreading is disclosed in the presentation documents to the International Forum on fourth Generation Mobile Communications entitled "Broadband Packet Wireless Access and its Experiments" by Hiroyuki Atarashi. In that document, the proposed mapping is not optimum in the sense that some large de-correlation may occur for some sub-channels that are mapped to consecutive chips of a spread out symbol.

SUMMARY OF THE INVENTION

The aim of the invention is therefore to propose a method which makes it possible to reduce the effects of the channel frequency selectivity, the channel time selectivity and the effects of the interference on the performance of the transmission network under consideration by mapping the chips of a spread out symbol to sub-channels in a efficient manner so that high correlation is maintained for sub-channels that are mapped to consecutive chips of a spread out symbol.

To that end, the present invention concerns a method of mapping chips of a spread out symbol to sub-channels of a group of sub-channels of a Multi-Carrier transmission channel of a Multi-Carrier transmission network, the spread out symbol being formed by multiplying a data item to be transmitted by elements of a spreading sequence, the mapped chips being further modulated using an orthogonal frequency division multiplexing modulation, each sub-channel of the Multi-Carrier transmission channel being defined by a carrier frequency of the Multi-Carrier transmission channel and a time slot wherein an orthogonal frequency division multiplexing symbol is transmitted, characterised in that the chips are ordered in a predetermined order, the first chip is mapped to a sub-channel and each of the following chips is mapped to a sub-channel which has the same carrier frequency or the same time slot as the sub-channel of which the previous chip has been mapped to.

The present invention concerns also a device for mapping chips of a spread out symbol to sub-channels of a group of sub-channels of a Multi-Carrier transmission channel of a Multi-Carrier transmission network, the spread out symbol being formed by multiplying a data item to be transmitted by elements of a spreading sequence, the mapped chips being further modulated using an orthogonal frequency division multiplexing modulation, each sub-channel of the Multi-Carrier transmission channel being defined by a carrier frequency of the Multi-Carrier transmission channel and a time slot wherein an orthogonal frequency division multiplexing symbol is transmitted, characterised in that the chips are ordered in a predetermined order, the devise comprises means for mapping the first chip to a sub-channel and means for mapping each of the following chips to a sub-channel which has the same carrier frequency or the same time slot as the sub-channel of which the previous chip has been mapped to.

The present invention concerns also a method of de-mapping chips of a spread out symbol from sub-channels of a group of sub-channels of a Multi-Carrier transmission channel of a Multi-Carrier transmission network, the chips being previously demodulated using an orthogonal frequency division multiplexing demodulation, each sub-channel of the Multi-Carrier transmission channel being defined by a carrier frequency of the Multi-Carrier transmission channel and a time slot wherein an orthogonal frequency division multiplexing symbol is received, characterised in that a first chip is de-mapped from a sub-channel and each of the following chips is de-mapped from a sub-channel which has the same carrier frequency or the same time slot as the sub-channel of which the previous chip has been de-mapped from.

The present invention concerns also a device for de-mapping chips of a spread out symbol from sub-channels of a group of sub-channels of a Multi-Carrier transmission channel of a Multi-Carrier transmission network, the chips being previously demodulated using an orthogonal frequency division multiplexing demodulation, each sub-channel of the Multi-Carrier transmission channel being defined by a carrier frequency of the Multi-Carrier transmission channel and a time slot wherein an orthogonal frequency division multiplexing symbol is received, characterised in that the device has means for de-mapping a first chip from a sub-channel, and means for de-mapping each of the following chips from a sub-channel which has the same carrier frequency or the same time slot as the sub-channel of which the previous chip has been de-mapped from.

Thus, the sub-channels mapped to consecutive chips have a high correlation. The correlation between sub-channels is then maximized and multiple access interferences are reduced.

According to still another aspect, the group of sub-channels comprises sub-channels which have time slots between predetermined time slots and which have carrier frequencies between predetermined carrier frequencies.

Thus, all the sub-channels in the group of sub-channels have a large correlation between each other.

According to a particular feature, the number L of sub-channel comprised in a group of sub-channel is equal to the number L of chips of the spread out symbol.

According to a particular feature, the Multi-Carrier transmission channel comprises a plurality of groups of sub-channels, each spread out symbol of a frame of data comprising a plurality of spread out symbols is assigned to a respective group of sub-channels.

Thus, the Multi-Carrier transmission channel is used at the maximum of its capacity and interference among multiple symbols is reduced.

According to a particular feature, the Multi-Carrier transmission network comprises several users, a spreading sequence is allocated to each user and the spreading sequences allocated to users are spreading sequences of a predefined set of spreading sequences.

By virtue of that feature, it is possible to reduce the multiple access interference by selecting a proper set of spreading sequences. The chip mapping as proposed in the present invention warrants a high correlation between each sub-channel mapped to consecutive chips and reduce a lot the multiple access interferences.

According to a particular feature, the predefined set of spreading sequences consists in the spreading sequences which minimize a function representing the interference between the spreading sequence and the spreading sequences of the said predefined set of spreading sequences.

The selection of spreading sequences which minimize a function representing the interference between the spreading sequence and the spreading sequences of the said predefined set of spreading sequences reduce a lot multiple access interferences. The combination of that technique with two-dimensional chip mapping may lead to decrease the efficiency of the selection of spreading sequence if the two-dimensional chip mapping is made as usual. The combination of these two technologies may even lead to a cancellation of the respective merits of these technologies. Inventor found that by making a chip mapping providing a high correlation between sub-channels mapped to consecutive chips, the merits of these two technologies were added and thus, the multiple access interferences are reduced a lot.

According to a particular feature, the spreading sequences are put in a natural order in the predefined set of spreading sequences, each spreading sequence is a Walsh-Hadamard sequence, the predefined set of spreading sequences is a Walsh-Hadamard matrix and the spreading sequences are assigned to users of the Multi-Carrier transmission network according to their order in the predefined set of spreading sequences.

That assignment of spreading sequences according to the order of spreading sequences in a predefined set of spreading sequences reduces a lot multiple access interferences. The combination of that technique with two-dimensional chip mapping may lead to decrease the efficiency of the selection of spreading sequence if the two-dimensional chip mapping is made as usual. The combination of these two technologies may even lead to a cancellation of the respective merits of these technologies. Inventor found also that by making a chip mapping providing a high correlation between sub-channels mapped to consecutive chips, the merits of these two technologies were added and thus, as sub-channels are highly correlated, the optimised assignment of spreading sequences to users minimizes the multiple access interferences among different users.

According to still another aspect, the present invention concerns a computer program which can be directly loadable into a programmable device, comprising instructions or portions of code for implementing the steps of the methods according to the invention, when said computer program is executed on a programmable device. Since the features and advantages relating to the computer program and device are the same as those set out above relating to the method according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which:

FIG. 8 is an example of a lookup table used for the mapping of the chips of spread out symbols to sub-channels of a group of sub-channels of the Multi-Carrier transmission network;

FIG. 9 is an example of a lookup table used for the de-mapping of the chips of spread out symbols from sub-channels of a group of sub-channels of the Multi-Carrier transmission network.

DESCRIPTION OF THE PREFERRED EMBODIMENTS

In a Multi-Carrier transmission network such as a MC-CDMA transmission network or an OFCDM transmission network, there is generally a base station and several mobile stations. The base station assigns spreading sequences to each mobile station called hereinafter users. When the base station or users have to transmit data items, they map chips of spread out symbols to sub-channels of a group of sub-channels of a Multi-Carrier transmission network.

The present invention consists in mapping chips of spread out symbols to sub-channels for maximizing the correlation between sub-channels mapped to consecutive chips.

Figure 1:
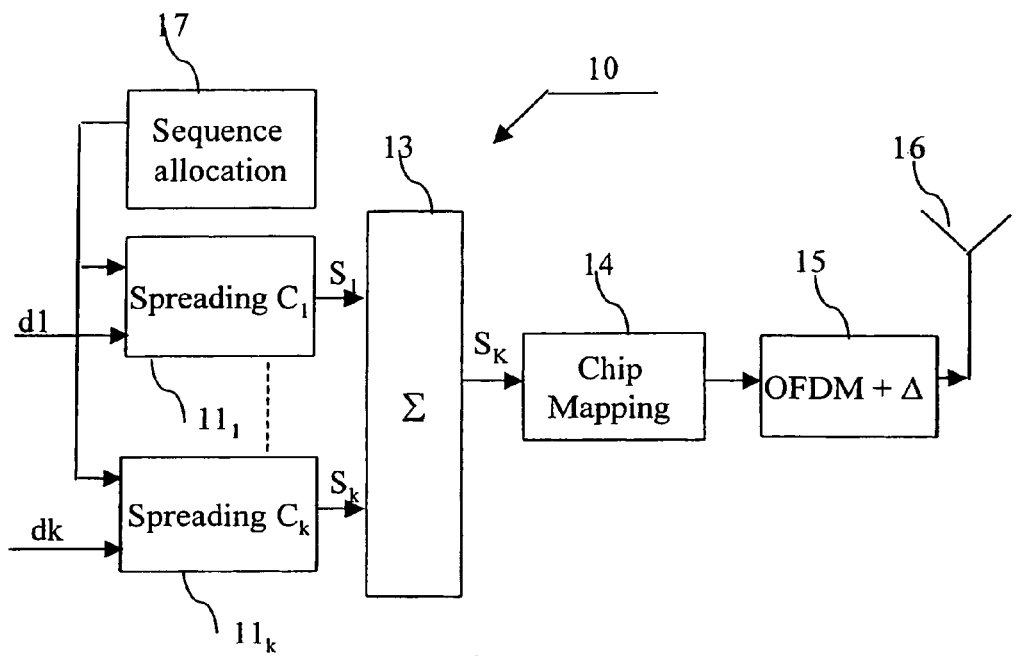
FIG. 1 is a block diagram of a transmitter of the Multi-Carrier transmission network.

FIG. 1 is a block diagram of a transmitter of the Multi-Carrier transmission network.

The transmitter 10 of the Multi-Carrier transmission network is as example the transmission unit of a base station.

The transmitter 10 transmits data to k users. The transmitter 10 comprises k multipliers noted $11_1$ to $11_k$. Each multiplier 11 spreads data items d which have to be transmitted respectively to each user using a spreading sequence C which has been assigned to each user by a sequence allocation module 17.

The multiplier $11_1$ multiplies the data item d1 which has to be transmitted to user 1 by each element of the spreading sequence $C_1$ of length L which has been assigned to user 1 by the sequence allocation module 17.

The multiplier $11_k$ multiplies the data item dk which has to be transmitted to user k by each element of the spreading sequence $C_k$ of length L which has been assigned to user k by the sequence allocation module 17.

In a preferred embodiment, the sequence allocation module 17 assigns the spreading sequences of a predefined set of spreading sequences to users which minimize a function representing the interference between the spreading sequence assigned to a user and the spreading sequences of the said predefined set of spreading sequences. The sequence allocation module implements the assigning method as disclosed in the European patent EP 1085689.

According to a variant, the sequence allocation module 17 assigns the spreading sequences to users by obtaining for each user of the Multi-Carrier transmission network, spatial information, by putting in order the users according to the spatial information, and assigning to each user according to its order at least a spreading sequence among a group of ordered spreading sequences. More precisely, each spreading sequence is a Walsh-Hadamard sequence and the group of ordered spreading sequences is a Walsh-Hadamard matrix whose lines or columns are in a natural order.

The Wash-Hadamard matrix can be an original Walsh-Hadamard matrix or an obtained Walsh-Hadamard matrix.

An original Walsh-Hadamard matrix $W_L$ of size L is defined by the following iterative rule:

$$W_1 = 1$$
$$W_L = \begin{bmatrix} W_{L/2} & W_{L/2} \\ W_{L/2} & -W_{L/2} \end{bmatrix}$$

It has to be noted here that the lines or the columns of an original Walsh-Hadamard matrix $W_L$ formed by that iterative rule are ordered in an order which is called the natural order of a Walsh-Hadamard matrix.

An obtained Walsh-Hadamard matrix is a matrix obtained by multiplying element by element each line or column of an original Walsh-Hadamard matrix by an imposed common spreading sequence. In such case, if lines of the original matrix are multiplied by an imposed common spreading sequence, the spreading sequences are included in the lines of the obtained Walsh-Hadamard matrix. If columns of the original matrix are multiplied by an imposed common spreading sequence, the spreading sequences are included in the columns of the obtained Walsh-Hadamard matrix.

An obtained Walsh-Hadamard matrix is also a matrix obtained by multiplying at least one line or one column of an original Walsh-Hadamard matrix or an obtained Walsh-Hadamard matrix as described previously, by at least one predetermined value such as a constant. In such case, if lines of the original matrix are multiplied by a constant, the spreading sequences are included in the lines of the obtained Walsh-Hadamard matrix. If columns of the original matrix or the obtained matrix as described previously are multiplied by a constant, the spreading sequences are included in the columns of the obtained Walsh-Hadamard matrix.

It has to be noted here that the lines or the columns of an obtained Walsh-Hadamard matrix $W_L$ are ordered in an order which is called the natural order of a Walsh-Hadamard matrix.

According to another variant, the sequence allocation module 17 assigns dynamically the spreading sequences of a group of spreading sequences according to the order of the spreading sequences in the group of spreading sequences put in a natural order to each user of the Multi-Carrier transmission network.

The data items d1 to dk which have to be transmitted to users 1 to k are multiplied respectively by the spreading sequences $C_1$ to $C_k$ and form spread out symbols noted $S_1$ to $S_k$ of length L. The spread out symbols are then input in an adder 13. The adder 13 adds respectively the chips of the spread out symbols of the same order and form then a spread out symbol $S_K$ of length L.

The chips of the spread out symbol $S_K$ are then transferred to a chip mapping module 14 which maps chips of the spread out symbol $S_K$ to sub-channels of a group of sub-channels of the Multi-Carrier channel.

The chip mapping module 14 maps the L chips to L of the $N_T N_F$ sub-channels of the Multi Carrier Channel. $N_T$ is the number of time slots and $N_F$ is the number of carrier frequencies.

Figures 3, 4, 5A, 5B:
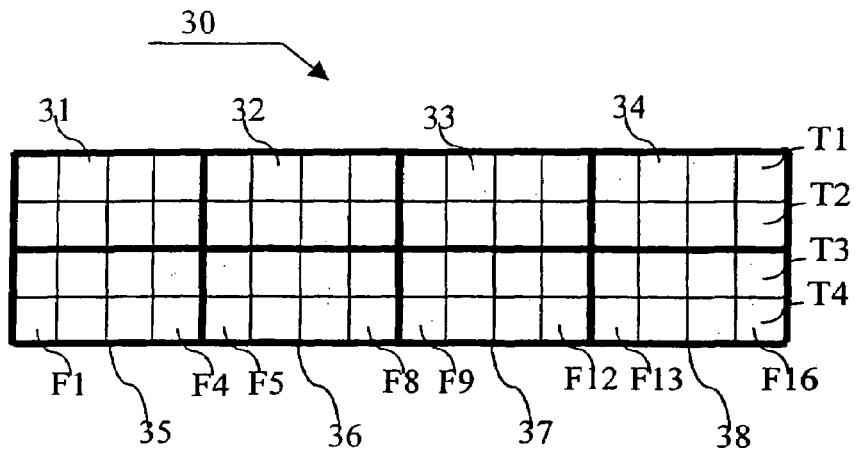
FIG. 3 is a view of the groups of sub-channels of the Multi-Carrier transmission channel.
FIG. 4 is an example of two-dimensional mapping as proposed in the prior art solution.
FIG. 5a is an example of two-dimensional mapping as proposed in the present invention when the correlation is more important in the time domain than in the frequency domain.
FIG. 5b is an example of two-dimensional mapping as proposed in the present invention when the correlation is more important in the frequency domain than in the time domain.
Figure 6:
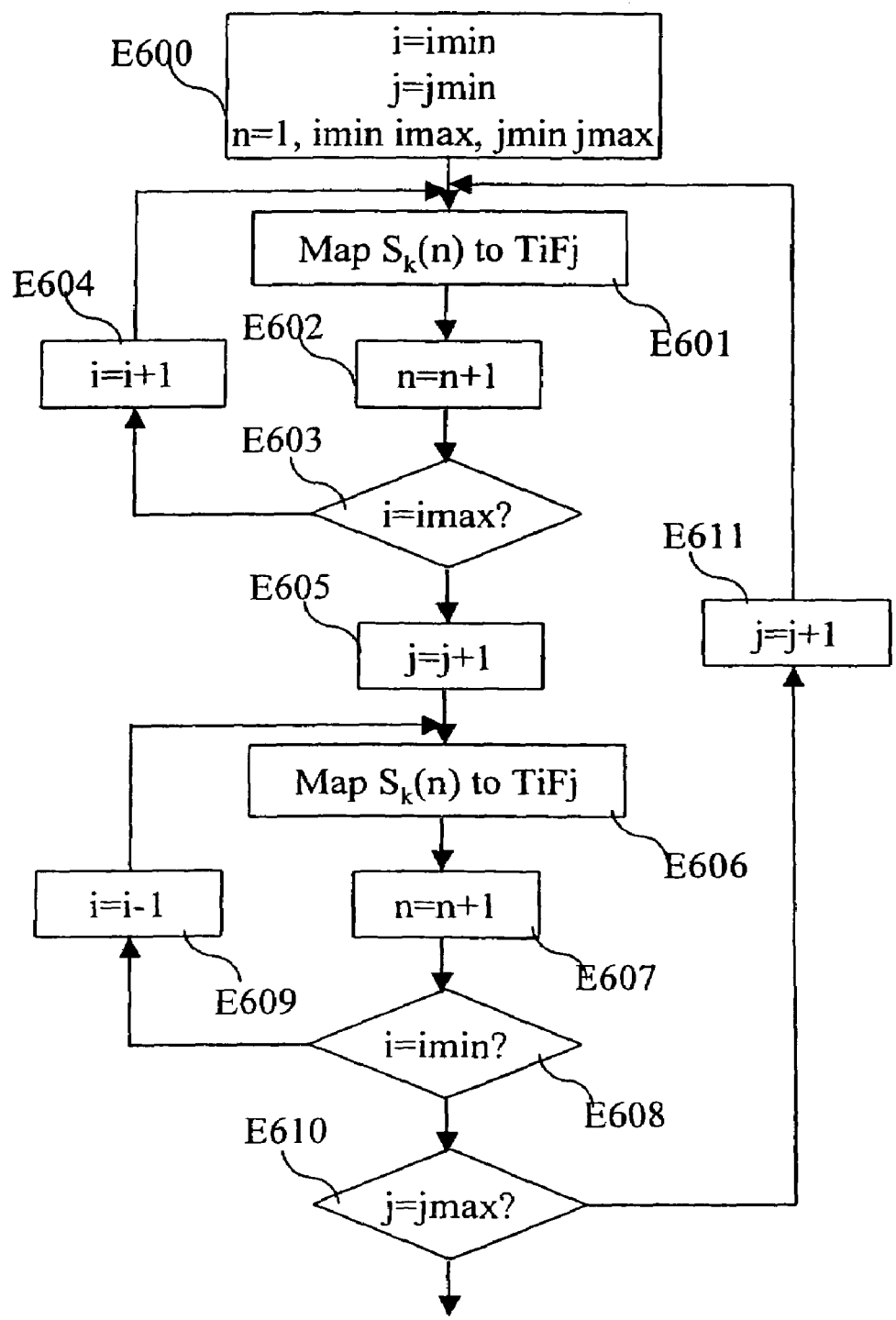
FIG. 6 is an algorithm for mapping chips of a spread out symbol to sub-channels of a group of sub-channels of a Multi-Carrier transmission network.

The mapping made by the chip mapping module 14 will be disclosed more precisely in view of FIGS. 3, 5 and 6.

Finally an OFDM modulation is carried out and a guard interval Δ is inserted in order to prevent intersymbol interference by an OFDM module 15. The guard interval Δ which has a length typically greater than the duration of the impulse response of the transmission channel, is inserted in front of the symbol outputted. This is achieved in practice by adding a prefix Δ which is identical to the end of the said symbol. The resulting symbol is then filtered and transmitted to a plurality of users through an antenna 16.

It has to be noted here that in a variant, beamforming techniques using a plurality of antennas can be used in the present invention. A beamforming technique is as example disclosed in the publication entitled "Transmit Beamforming for SDMA in Multi-Carrier CDMA Downlink on a Per Subcarrier Basis" made by T Salzer and D Mottier in the Proceeding in International Conference ITC 2003 Vol 1 p 793 to 798 February 2003 Such techniques are particularly efficient when the sequence allocation module 17 assigns spreading sequences to users according to their spatial location.

It has to be noted here that spatial location can be obtained using global positioning information or the average direction of departure of signals transmitted to users.

Figure 2:
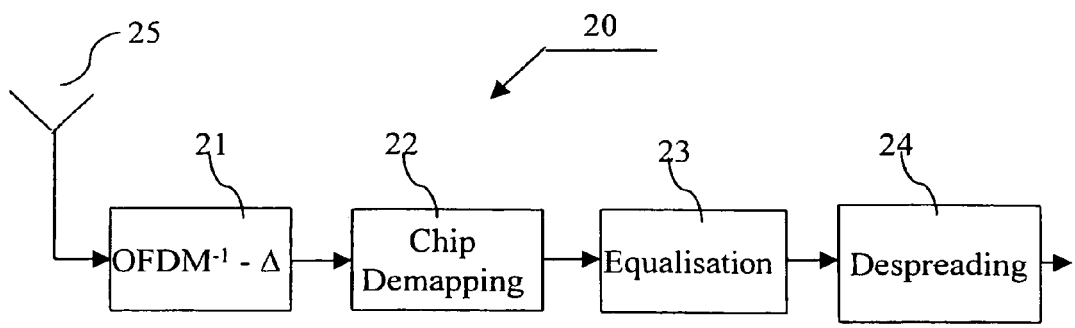
FIG. 2 is block diagram of a receiver of the Multi-Carrier transmission network.

FIG. 2 is block diagram of a receiver of the Multi-Carrier transmission network.

The receiver 20 of the Multi-Carrier transmission network is as example the reception unit of a mobile station or a user 1.

The signal transmitted by the transmission unit 10 of a base station is received by an antenna 25.

The receiver 20 comprises an inverse OFDM module 21, a chip de-mapping module 22, an equalisation module 23 and a de-spreading module 24.

The inverse OFDM module 21 makes an orthogonal frequency division multiplexing demodulation after a removal of the guard time Δ from the received signal.

The chip de-mapping module 22 collects the signal received from the $N_T N_F$ sub-channels dedicated to the transmission of the data item received, which is in our example the data item d1.

The collected signals are then transferred to an equalisation module 23 which adjusts the phase and the amplitude of each signal transmitted on the different sub-channels.

The equalised signals are then transferred to a de-spreading unit 24 which de-spread the equalised signals using the spreading sequence assigned to the user and the received data item is finally outputted by the receiver 20 for further processing.

FIG. 3 is a view of the groups of sub-channels of the Multi-Carrier transmission channel.

The Multi-Carrier transmission channel 30 is decomposed into time and frequency domains.

For example, the Multi-Carrier transmission channel 30 is decomposed into four time slots noted T1 to T4 and sixteen carrier frequencies noted F1 to F16.

A real Multi-Carrier transmission channel is decomposed into much more time slots and carrier frequencies, but for simplification reasons, only four time slots and sixteen carrier frequencies are shown here.

The Multi-Carrier transmission channel 30 is also decomposed into a plurality of group of sub-channels noted 31 to 38.

A group of sub-channels is dedicated to the transmission of a data item of the frame of data. As example the group of sub-channels noted 31 is dedicated to the transmission of the first data item to users 1 to k of a frame of data. The groups of sub-channels noted 32 to 38 are respectively dedicated to the transmission of the respective second to eighth data items of the frame of data to users 1 to k.

It has to be noted also that the order mentioned previously can also be modified and, as example the groups of sub-channels 35, 36, 32 33, 37, 38 and 34 can be respectively dedicated to the transmission of the respective second to eighth data item of the frame of data to users 1 to k.

Each group of sub-channels comprises sub-channels which have a time slot between predetermined time slots and which have carrier frequencies between predetermined carrier frequencies.

The group of sub-channels 31 comprises the sub-channels which have a time slot between time slots noted T1 and T2 and which have carrier frequencies between carrier frequencies F1 and F4.

The group of sub-channels 32 comprises the sub-channels which have a time slot between time slots noted T1 and T2 and which have carrier frequencies between carrier frequencies F5 and F8.

The group of sub-channels 37 comprises the sub-channels which have a time slot between time slots noted T3 and T4 and which have carrier frequencies between carrier frequencies F9 and F12.

The group of sub-channels 38 comprises the sub-channels which have a time slot between time slots noted T3 and T4 and which have carrier frequencies between carrier frequencies F13 and F16.

Each group of sub-channels comprises a predetermined number of sub-channels which is equal to the number of chips of the spread out symbol. In the present example, the number L of sub-channels and the number of chips is equal to eight.

FIG. 4 is an example of two-dimensional mapping as proposed in the prior art.

In the present example, the number L of sub-channels and the number of chips is equal to eight.

In the two-dimensional spreading disclosed in FIG. 4, the mapping of the chips of the spread out symbols in not optimum in the sense that some large de-correlations occur for some sub-channels that are mapped to consecutive chips of a spread out symbol.

As example, the consecutive chips $S_K(2)$ and $S_K(3)$ are mapped to sub-channels which are not highly correlated. This is also the same for the consecutive chips $S_K(4)$ and $S_K(5)$, $S_K(6)$ and $S_K(7)$.

The chip $S_K(2)$ is mapped to a sub-channel which has a carrier F2 and a time slot T1. The chip $S_K(3)$ is mapped to a sub-channel which has a carrier F1 and a time slot T2. So, the two consecutive chips $S_K(2)$ and $S_K(3)$ have no common sub-channel characteristics, they are mapped to different carrier frequencies and also to different time slots.

Such mapping generates some de-correlation for consecutive chips of spread out symbols and when the spreading sequences are assigned in an optimised order and/or according to some predetermined criteria as proposed in the present invention, the benefit of the use of such spreading sequences against multiple access interference is reduced a lot.

FIG. 5a is an example of two-dimensional mapping as proposed in the present invention when the correlation is more important in the time domain than in the frequency domain.

In the present example, the number L of sub-channels and the number of chips is equal to eight.

In the two-dimensional spreading disclosed in FIG. 5a, the mapping of the chips of spread out symbols is optimum in the sense that a high correlation is maintained for all sub-channels of which consecutive chips of a spread out symbol have been mapped to.

The mapping as disclosed in FIG. 5a is preferably used when the correlation in the time domain is more important than the correlation in the frequency domain.

The chip $S_K(1)$ is mapped to a sub-channel which has a carrier frequency F1 and a time slot T1. The consecutive chip $S_K(2)$ is mapped to a sub-channel which has a carrier frequency F1 and a time slot T2. So, the two consecutive chips $S_K(1)$ and $S_K(2)$ have the same carrier frequency F1, they are then highly correlated.

The chip $S_K(2)$ is mapped to a sub-channel which has a carrier frequency F1 and a time slot T2. The following chip $S_K(3)$ is mapped to a sub-channel which has a carrier F2 and a time slot T2. So, the two consecutive chips $S_K(2)$ and $S_K(3)$ have the same time slot T2, they are then also highly correlated.

In fact, each of the chips $S_K(1)$ to $S_K(8)$ is mapped to a sub-channel which has the same carrier frequency or the same time slot as the sub-channel of which the previous chip has been mapped to.

Such mapping warrants that high correlation for consecutive chips of spread out symbols is maintained and when the spreading sequences are assigned in an optimised order and/or according to some predetermined criteria as proposed in the present invention, the benefit of the use of such spreading sequences against multiple access interference is maximum.

FIG. 5b is an example of two-dimensional mapping as proposed in the present invention when the correlation is more important in the frequency domain than in the time domain.

In the present example, the number L of sub-channels and the number of chips is equal to eight.

In the two-dimensional spreading disclosed in FIG. 5b the mapping of the chips of spread out symbols is optimum in the sense that a high correlation is maintained for all sub-channels of which consecutive chips of a spread out symbol have been mapped to.

The mapping as disclosed in FIG. 5b is preferably used when the correlation in the frequency domain is more important than the correlation in the time domain.

The chip $S_K(1)$ is mapped to a sub-channel which has a carrier frequency F1 and a time slot T1. The following chip $S_K(2)$ is mapped to a sub-channel which has a carrier frequency F2 and a time slot T1. So, the two consecutive chips $S_K(1)$ and $S_K(2)$ have the same time slot T1, they are then highly correlated.

The chips $S_K(1)$ and $S_K(2)$, $S_K(2)$ and $S_K(3)$, $S_K(3)$ and $S_K(4)$ are mapped respectively to sub-channels which have the same time slot T1. So, the chips $S_K(2)$, $S_K(3)$ and $S_K(4)$ are then highly correlated.

The chip $S_K(4)$ is mapped to a sub-channel which has a carrier frequency F4 and a time slot T1. The following chip $S_K(5)$ is mapped to a sub-channel which has a carrier frequency F4 and a time slot T2. So, the two consecutive chips $S_K(4)$ and $S_K(5)$ have the same carrier frequency F4, they are then highly correlated.

In fact, all of the chips $S_K(1)$ to $S_K(8)$ are mapped to a sub-channel which has the same carrier frequency or the same time slot as the sub-channel of which the previous chip has been mapped to.

Such mapping warrants that high correlation for consecutive chips of spread out symbols is maintained and when the spreading sequences are assigned in an optimised order and/or according to some predetermined criteria as proposed in the present invention, the benefit of the use of such spreading sequences against multiple access interference is maximum.

It has to be noted here that the distance between two sub-channels which have the same time slot or the same carrier frequency in the Multi-Carrier channel is reduced in comparison with the distance between two sub-channels which have different time slots and carrier frequencies in the Multi-Carrier channel. The correlation between consecutive time slots is then increased.

FIG. 6 is an algorithm for mapping chips of a spread out symbol to sub-channels of a group of sub-channels of a Multi-Carrier transmission channel.

The present algorithm is executed by the chip mapping module 14 of the transmitter of the Multi-Carrier transmission network when the correlation in the time domain is more important than the correlation in the frequency domain. Such case corresponds to the example described in reference to the FIG. 5a.

The present algorithm is executed when the L number of chips of the spreading sequence is equal to the number L of sub-channels comprised in the group of sub-channels.

At the first step E600 of the present algorithm, the variables i, j are set according to the respective parameters related to the group of sub-channels to be mapped.

As example, if the mapping is made on the group of sub-channels noted 31 in FIG. 3, the parameters related to that group are imin=1, imax=2, jmin=1 and jmax=4, where imin represents the indicia of the lowest time slot of the group of sub-channels, imax represents the indicia of the highest time slot of the group of sub-channels, jmin represents the indicia of the lowest carrier frequency of the group of sub-channels and jmax represents the indicia of the highest carrier frequency of the group of sub-channels.

The variables i and j are then respectively set to imin and jmin.

If the mapping is made on the group of sub-channels noted 33 in FIG. 3, the parameter related to that group are imin=1, imax=2, jmin=9 and jmax=12.

At that step, the variable n is also set to the value 1.

At next step E601, the chip $S_K(n)$ is mapped to the sub-channel which has a time slot which corresponds to the variable i and the carrier frequency which corresponds to the variable j. At next step E602, the variable n is incremented by one unit.

At next step E603, it is checked whether or not the variable i is equal to the parameter imax.

If the variable i is different from the parameter imax, the variable i is incremented by one unit at step E604 and as far as the variable i is not equal to the parameter imax, the loop made by steps E601 to E604 is executed.

If the variable i is equal to the parameter imax, the variable j is incremented by one unit at step E605.

At next step E606, the chip $S_K(n)$ is mapped to the sub-channel which has a time slot which corresponds to the variable i and the carrier frequency which corresponds to the variable j.

At next step E607, the variable n is incremented by one unit.

At next step E608, it is checked whether or not the variable i is equal to the parameter imin.

If the variable i is different from the parameter imin, the variable i is decremented by one unit at step E609 and as far as the variable i is not equal to the parameter imin, the loop made by steps E606 to E609 is executed.

If the variable i is equal to the parameter imin, it is checked at the following step E610 whether or not the variable j is equal to the parameter jmax.

If the variable j is not equal to the parameter jmax, the variable j is incremented of one unit at step E611 and the loop made by steps E601 to E611 is executed as far as the variable j is not equal to the parameter jmax.

If the variable j is equal to the parameter jmax, all the chips of the spread out symbol have been mapped to sub-channels of the group of sub-channels. The algorithm then returns to step E600 and maps the chips of the following spread out symbol to sub-channels of the following group of sub-channels.

It has to be noted here that a similar algorithm is executed by the chip mapping module 14 of the transmitter of the Multi-Carrier transmission network when the correlation in the frequency domain is more important than the correlation in the time domain. In that case, The step E603 is replaced by a comparison of j to jmax, the variable j is incremented by one unit at step E604 instead of i, the variable i is incremented by one unit at step E605 instead of j, the step E608 is replaced by a comparison of j to jmin, the variable j is decremented by one unit at step E609 instead of i, the step E610 is replaced by a comparison of i to imax and the variable i is incremented by one unit at step E611 instead of j.

It has to be noted also here that in above example, chips are mapped according to an ascending order, chips can also be mapped according to a descending order.

Figure 7:
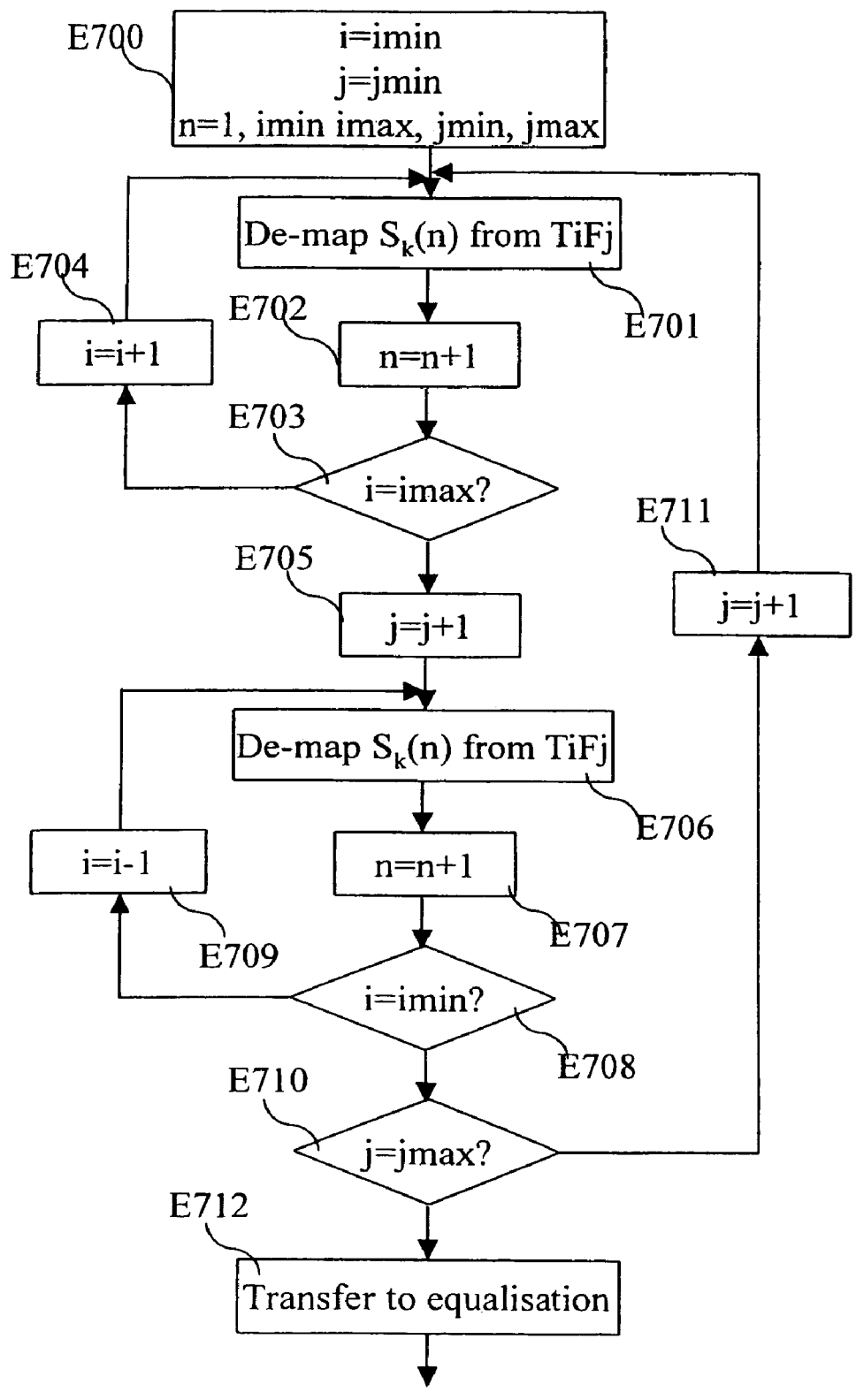
FIG. 7 is an algorithm for de-mapping chips of a spread out symbol from sub-channels of a group of sub-channels of a Multi-Carrier transmission network.

FIG. 7 is an algorithm for de-mapping chips of a spread out symbol from sub-channels of a group of sub-channels of a Multi-Carrier transmission channel.

The present algorithm is executed by the chip de-mapping module 22 of the receiver of the Multi-Carrier transmission network when the correlation in the time domain is more important than the correlation in the frequency domain. Such case corresponds to the example described in reference to the FIG. 5a.

The present algorithm is executed when the L number of chips of the spreading sequence is equal to the number L of sub-channels comprised in the group of sub-channels.

At the first step E700 of the present algorithm, the variables i, j are set according to the respective parameters related to the group of sub-channels to be mapped.

As example, if the de-mapping is made from the group of sub-channels noted 31 in FIG. 3, the parameters related to that group are imin=1, imax=2, jmin=1 and jmax=4, where imin represents the indicia of the lowest time slot of the group of sub-channels, imax represents the indicia of the highest time slot of the group of sub-channels, jmin represents the indicia of the lowest carrier frequency of the group of sub-channels and jmax represents the indicia of the highest carrier frequency of the group of sub-channels.

The variables i and j are then respectively set to imin and jmin.

A that step, the variable n is also set to the value 1.

At next step E701, the chip $S_K(n)$ is de-mapped from the sub-channel which has a time slot which corresponds to the variable i and the carrier frequency which corresponds to the variable j.

At next step E702, the variable n is incremented by one unit.

At next step E703, it is checked whether or not the variable i is equal to the parameter imax.

If the variable i is different from the parameter imax, the variable i is incremented by one unit at step E704 and as far as the variable i is not equal to the parameter imax, the loop made by steps E701 to E704 is executed.

If the variable i is equal to the parameter imax, the variable j is incremented by one unit at step E705.

At next step E706, the chip $S_K(n)$ is de-mapped from the sub-channel which has a time slot which corresponds to the variable i and the carrier frequency which corresponds to the variable j.

At next step E707, the variable n is incremented by one unit.

At next step E708, it is checked whether or not the variable i is equal to the parameter imin.

If the variable i is different from the parameter imin, the variable i is decremented by one unit at step E709 and as far as the variable i is not equal to the parameter imin, the loop made by steps E706 to E709 is executed.

If the variable i is equal to the parameter imin, it is checked at the following step E710 whether or not the variable j is equal to the parameter jmax.

If the variable j is not equal to the parameter jmax, the variable j is incremented of one unit at step E711 and the loop made by steps E701 to E711 is executed as far as the variable j is not equal to the parameter jmax.

If the variable j is equal to the parameter jmax, all the chips of the spread out symbol have been de-mapped from sub-channels of the group of sub-channels.

The de-mapped chips are then transferred at step E712 to the equalisation module 23 of the receiver 20.

The algorithm then returns to step E700 and de-maps the chips of the following spread out symbol from sub-channels of the following group of sub-channels.

It has to be noted here that a similar algorithm is executed by the chip de-mapping module 22 of the receiver 20 of the Multi-Carrier transmission network when the correlation in the frequency domain is more important than the correlation in the time domain. The modification which have to be made are the same as it has been previously disclosed in reference to the FIG. 6.

It has to be noted also here that in above example, chips are de-mapped according to an ascending order, chips can also be de-mapped according to a descending order.

FIG. 8 is an example of a lookup table used for the mapping of the chips of spread out symbols to sub-channels of a group of sub-channels of the Multi-Carrier transmission network.

As example, the chip mapping module 14 instead of implementing above algorithm, uses the lookup table 800 for the mapping of the chips of spread out symbols to sub-channels of the groups of sub-channels of the Multi-Carrier transmission network.

As example, the maximum length of spreading sequences is equal to eight. The Multi-Carrier transmission network authorises also variable length of spreading sequences and as example a spreading sequence of a length of four is assigned to the user noted user 2. By using such shorter spreading sequences, the user 2 can transmit or receive data at higher bit rate than other users.

To each user of the Multi-Carrier network, it is assigned a column noted 801 to 80k of the lookup table 800.

To each sub-channel of the group of sub-channels it is assigned a line noted 81 to 88.

The chip mapping module 14 reads the content of the line associated to a sub-channel and maps the sum of corresponding chips of spread out symbols formed by multiplying a data item to be transmitted by each element the corresponding spreading sequence.

For user 1 to user k, the chip mapping module 14 maps the sum of the first chips noted $S_1(1), S_2(1) \ldots S_k(1)$ in line 81 of the spread out symbols which have to be transmitted to the sub-channel which is defined by the time slot T1 and the carrier frequency F1 if the group of sub-channels is the first group of sub-channels.

The chip mapping module 14 maps the sum of the second chips noted $S_1(2), S_2(2) \ldots S_k(2)$ in line 82 of the first spread out symbols which have to be transmitted to the sub-channel which is defined by the time slot T2 and the carrier frequency F1.

The chip mapping module 14 maps the sum of the third chips noted $S_1(3), S_2(3) \ldots S_k(3)$ in line 83 of the first spread out symbols which have to be transmitted to the sub-channel which is defined by the time slot T2 and the carrier frequency F2.

The chip mapping module 14 maps the sum of the fourth chips noted $S_1(4), S_2(4) \ldots S_k(4)$ in line 84 of the first spread out symbols which have to be transmitted to the sub-channel which is defined by the time slot T1 and the carrier frequency F2.

The chip mapping module 14 maps the sum of the fifth chips noted $S_1(5), \ldots S_k(5)$ in line 85 of the first spread out symbols which have to be transmitted and the first chip noted $S_2(1)$ of the second spread out symbol which has to be transmitted to the sub-channel which is defined by the time slot T1 and the carrier frequency F3.

As, according to our example, a spreading sequence of length equal to four has been assigned to user 2, two spread out symbols can be mapped to a group of sub-channels and then transmitted to user 2.

The chip mapping module 14 maps the sum of the sixth chips noted $S_1(6), \ldots S_k(6)$ in line 86 of the first spread out symbols which have to be transmitted and the second chip noted $S_2(2)$ of the second spread out symbol which has to be transmitted to the sub-channel which is defined by the time slot T2 and the carrier frequency F3.

The chip mapping module 14 maps the sum of the seventh chips noted $S_1(7), \ldots S_k(7)$ in line 87 of the first spread out symbols which have to be transmitted and the third chip noted $S_2(3)$ of the second spread out symbol which has to be transmitted to the sub-channel which is defined by the time slot T2 and the carrier frequency F4.

The chip mapping module 14 maps the sum of the eighth chips noted $S_1(8), \ldots S_k(8)$ in line 88 of the first spread out symbols which have to be transmitted and the fourth chip noted $S_2(4)$ of the second spread out symbol which has to be transmitted to the sub-channel which is defined by the time slot T1 and the carrier frequency F4.

Obviously, such table can be used for the de-mapping of the chips of spread out symbols from sub-channels of a group of sub-channels of the Multi-Carrier transmission network.

FIG. 9 is an example of a lookup table used for the de-mapping of the chips of spread out symbols from sub-channels of a group of sub-channels of the Multi-Carrier transmission network.

The chip de-mapping module 22 can use also the lookup table 900 for the de-mapping of the chips of spread out symbols from sub-channels of the groups of sub-channels of the Multi-Carrier transmission network.

Each user of the Multi-Carrier transmission network has a look up table which corresponds to the mapping which has been made by the transmitter of the Multi-Carrier network.

The lookup table 900 is as example the lookup table of the user 1.

The lookup table comprises two columns noted 900 and 901 which comprise the carrier frequency and the time slot of each sub-channel of a group of sub-channels and the corresponding chip of spread out symbols which has been map to a sub-channel.

To each sub-channel of the group of sub-channels it is assigned a line noted 91 to 98.

The chip de-mapping module 22 reads the content of the line associated to a sub-channel and de-maps corresponding chip of a spread out symbol.

The chip de-mapping module 22 de-maps the chip noted $S_K(1)$, from the sub-channel of the line 91 which is defined by the time slot T1 and the carrier frequency F1.

The chip de-mapping module 22 de-maps the chip noted $S_K(2)$, from the sub-channel of the line 92 which is defined by the time slot T2 and the carrier frequency F1.

The chip de-mapping module 22 de-maps the chip noted $S_K(3)$, from the sub-channel of the line 93 which is defined by the time slot T2 and the carrier frequency F2.

The chip de-mapping module 22 de-maps the chip noted $S_K(4)$, from the sub-channel of the line 94 which is defined by the time slot T1 and the carrier frequency F2.

The chip de-mapping module 22 de-maps the chip noted $S_K(5)$, from the sub-channel of the line 95 which is defined by the time slot T1 and the carrier frequency F3.

The chip de-mapping module 22 de-maps the chip noted $S_K(6)$, from the sub-channel of the line 96 which is defined by the time slot T2 and the carrier frequency F3.

The chip de-mapping module 22 de-maps the chip noted $S_K(7)$, from the sub-channel of the line 97 which is defined by the time slot T2 and the carrier frequency F4.

The chip de-mapping module 22 de-maps the chip noted $S_K(8)$, from the sub-channel of the line 98 which is defined by the time slot T1 and the carrier frequency F4.

Obviously, such table can be used for the mapping of the chips of spread out symbols from sub-channels of a group of sub-channels of the Multi-Carrier transmission network.

Naturally, many modifications can be made to the embodiments of the invention described above without departing from the scope of the present invention.

The invention claimed is:

1. A method of mapping chips of a spread out symbol to sub-channels of a group of sub-channels of a Multi-Carrier transmission channel of a Multi-Carrier transmission network, comprising:

forming the spread out symbol by multiplying a data item to be transmitted by elements of a spreading sequence; and modulating the mapped chips using an orthogonal frequency division multiplexing modulation, each sub-channel of the Multi-Carrier transmission channel being defined by a carrier frequency of the Multi-Carrier transmission channel and a time slot in which an orthogonal frequency division multiplexing symbol is transmitted, wherein the group of sub-channels comprise sub-channels having at least two different frequencies and at least two different time slots, the chips are ordered in a predetermined order, a first chip is mapped to a sub-channel and each following chip is mapped to a sub-channel having a same carrier frequency or a same time slot as the sub-channel to which an immediately previous chip was mapped, and wherein a number of sub-channels in the group of sub-channels is equal to a number of chips of the spread out symbol.

2. The method according to claim 1, wherein the group of sub-channels comprises sub-channels having time slots between predetermined time slots and having carrier frequencies between predetermined carrier frequencies.

3. The method according to claim 1, wherein the Multi-Carrier transmission channel comprises a plurality of groups of sub-channels, wherein each spread out symbol of a frame of data comprising a plurality of spread out symbols is assigned to a respective group of sub-channels.

4. The method according to claim 3, wherein the Multi-Carrier transmission network comprises several users, a spreading sequence is allocated to each user, and the spreading sequences allocated to the users are spreading sequences of a predefined set of spreading sequences.

5. The method according to claim 4, wherein the predefined set of spreading sequences consist of spreading sequences that minimize a function representing an interference between the spreading sequence and the spreading sequences of the said predefined set of spreading sequences.

6. The method according to claim 4, wherein the spreading sequences are put in a natural order in the predefined set of spreading sequences, each spreading sequence is a Walsh-Hadamard sequence, the predefined set of spreading sequences is a Walsh-Hadamard matrix, and spreading sequences are assigned to users of the Multi-Carrier transmission network according to their order in the predefined set of spreading sequences.

7. A method of de-mapping chips of a spread out symbol from sub-channels of a group of sub-channels of a Multi-Carrier transmission channel of a Multi-Carrier transmission network, comprising:

demodulating the chips using an orthogonal frequency division multiplexing demodulation, each sub-channel of the Multi-Carrier transmission channel being defined by a carrier frequency of the Multi-Carrier transmission channel and a time slot in which an orthogonal frequency division multiplexing symbol is received, wherein the group of sub-channels comprise sub-channels having at least two different frequencies and at least two different time slots, a first chip is de-mapped from a sub-channel and each following chip is de-mapped respectively from a sub-channel having a same carrier frequency or a same time slot of the sub-channel from which an immediately previous chip was de-mapped, and a number of sub-channels in the group of sub-channels is equal to a number of elements of the spreading sequence.

8. The method according to claim 7, further comprising:

multiplying the de-mapped chips by a spreading sequence.

9. The method according to claim 8, wherein the group of sub-channels comprises sub-channels having time slots between predetermined time slots and having carrier frequencies between predetermined carrier frequencies.

10. The method according to claim 7, wherein the Multi-Carrier transmission channel comprises a plurality of groups of sub-channels, wherein each spread out symbol of a frame of data comprising a plurality of spread out symbols is assigned to a respective group of sub-channels.

11. The method according to claim 10, wherein the Multi-Carrier transmission network comprises several users and a spreading sequence is allocated to each user,
the spreading sequences allocated to users are spreading sequences of a predefined set of spreading sequences, and
the spreading sequence multiplying the de-mapped chips is the spreading sequence allocated to the user performing the de-mapping.

12. The method according to claim 11, wherein the predefined set of spreading sequences consists of spreading sequences that minimize a function representing interference between the spreading sequence and the spreading sequences of said predefined set of spreading sequences.

13. The method according to claim 11, wherein the spreading sequences are put in a natural order in the predefined set of spreading sequences,
each spreading sequence is a Walsh-Hadamard sequence,
the predefined set of spreading sequences is a Walsh-Hadamard matrix, and
the spreading sequences are assigned to users of the Multi-Carrier transmission network according to their order in the predefined set of spreading sequences.

14. A device for mapping chips of a spread out symbol to sub-channels of a group of sub-channels of a Multi-Carrier transmission channel of a Multi-Carrier transmission network, comprising:
means for forming the spread out symbol by multiplying a data item to be transmitted by elements of a spreading sequence; and
means for modulating the mapped chips using an orthogonal frequency division multiplexing modulation, wherein each sub-channel of the Multi-Carrier transmission channel is defined by a carrier frequency of the Multi-Carrier transmission channel and a time slot in which an orthogonal frequency division multiplexing symbol is transmitted,
wherein the group of sub-channels comprise sub-channels having at least two different frequencies and at least two different time slots,
the chips are ordered in a predetermined order,
the device further comprising means for mapping a first chip to a sub-channel, and means for mapping each following chip to a sub-channel having a same carrier frequency or a same time slot as the sub-channel to which an immediately previous chip was mapped; and
a number of sub-channels in the group of sub-channels is equal to a number of chips of the spread out symbol.

15. A device for de-mapping chips of a spread out symbol from sub-channels of a group of sub-channels of a Multi-Carrier transmission channel of a Multi-Carrier transmission network, comprising:
means for demodulating the chips using an orthogonal frequency division multiplexing demodulation, each sub-channel of the Multi-Carrier transmission channel being defined by a carrier frequency of the Multi-Carrier transmission channel and a time slot in which an orthogonal frequency division multiplexing symbol is received, wherein the group of sub-channel comprise sub-channels having at least two different frequencies and at least two different time slots,
means for de-mapping a first chip from a sub-channel; and
means for de-mapping each following chip from a respective sub-channel having a same carrier frequency or a same time slot as the sub-channel from which an immediately previous chip was de-mapped,
wherein a number of sub-channels in the group of sub-channels is equal to a number of chips of the spread out symbol.

16. A computer-readable medium having embedded therein a program which can be directly loadable into a programmable device, the computer program comprising instructions or portions of code for implementing the steps of the method according to claim 1, when said computer program is executed on a programmable device.

17. A computer-readable medium having embedded therein a program which can be directly loadable into a programmable device, the computer program comprising instructions or portions of code for implementing the steps of the method according to claim 7, when said computer program is executed on a programmable device.

* * * * *